United States Patent [19]

Rogemont

[11] Patent Number: 4,624,465
[45] Date of Patent: Nov. 25, 1986

[54] PNEUMATIC SAFETY SEAL JOINT MADE OF ELASTOMER WITH INTERNAL SEPTUM

[75] Inventor: Jean Rogemont, St Chamond, France
[73] Assignee: CEFILAC, Paris, France
[21] Appl. No.: 769,028
[22] Filed: Aug. 26, 1985

[30] Foreign Application Priority Data

Aug. 30, 1984 [FR] France .................................. 84 13681

[51] Int. Cl.$^4$ .............................................. F16J 15/46
[52] U.S. Cl. ............................. 277/34; 277/2 277/226
[58] Field of Search .................. 277/2, 34, 34.3, 34.6, 277/226, 237

[56] References Cited

U.S. PATENT DOCUMENTS

| | | | |
|---|---|---|---|
| 2,700,196 | 1/1955 | Panhard | 277/226 X |
| 3,161,229 | 12/1964 | Sanders | 277/34 X |
| 3,178,779 | 4/1965 | Clark et al. | 277/34 X |
| 3,262,707 | 7/1966 | Williams | 277/34.3 |
| 3,940,152 | 2/1976 | Fournier | 277/34 |

FOREIGN PATENT DOCUMENTS 1187871 2/1965 Fed. Rep. of Germany ...... 277/226

Primary Examiner—Robert S. Ward
Attorney, Agent, or Firm—Oblon, Fisher, Spivak, McClelland & Maier

[57] ABSTRACT

A pneumatic safety seal joint, made of elastomer, generally designed to be installed in a slot or groove, this joint having an inflatable internal volume under the pressure of a fluid, and an external seal surface. The joint has an internal volume with maximum internal width l and a maximum internal height H and has an internal sealed septum which divides the internal volume into two chambers, each with a means for pressurization. This internal septum is connected to the lateral walls of the joint such that the respective volumes of the two chambers are in a ratio between 0.9 and 1.1 and when l/H is between 1 and 2, the developed width L of this sealed septum is between 1.1 times and 1.4 times l, when l/H is between 2 and 8, the developed width L is such that $1 \leq L \leq 1.2 l$. In case of the puncturing of one chamber the internal septum deforms and comes to press against the wall to be sealed, maintaining the seal. The joint improves the safety of seal devices in the nuclear, aerospace, electronic and medical areas.

7 Claims, 8 Drawing Figures

PNEUMATIC SAFETY SEAL JOINT MADE OF ELASTOMER WITH INTERNAL SEPTUM

BACKGROUND OF THE INVENTION

1. Field of the Invention

This invention pertains to a pneumatic seal joint made of elastomer, with improved safety due to an internal septum.

2. Related Art

The practice of utilizing retractable pneumatic joints, which can be inflated under the pressure of a fluid, to achieve a seal between two enclosures, chambers, tanks, or between them and the outside is known. Such joints are used in blowers, radiation chambers, amphibious vehicles, aircraft and spacecraft, for the doors or cofferdams of deactivation pools in nuclear power plants, retreatment shops for irradiated fuel, "white" chambers in the electronic and space industries and sterile rooms in hospitals.

All of these installations utilize, along with metal or concrete parts, or other structural materials, one or more joints providing a seal by inflation with pressurized air or fluid.

Such inflatable joints made of elastomer are described in French Patent No. 2,188,759 corresponding to British Patent Specification No. 1,440,666. In general, this type of joint includes a seal surface, which comes to press against a support, a fixed base, and two lateral walls connecting the seal surface and base.

The major and well-known shortcoming of this type of joint is that upon the appearance of a tear or perforation in one of the walls, the joint becomes defective due to the loss of motor fluid or air. It then becomes completely non-operational due to a retraction from the gap which it filled between the cofferdam or door and the part to be sealed, and it no longer fulfills its sealing function.

A safety device currently in use consists of placing, inside the inflatable joint cavity, an air chamber or impermeable membrane containing air or motor fluid and following all of the movements of the seal surface. Textile insertions, currently utilized in pneumatics, reinforce the walls. Tears or cuts on the outside part of the joint do not necessarily cause the perforation of the walls of the internal membrane. This is the system which is commonly utilized in pneumatic systems in automobiles and motorcycles. But when the wall of the joint is seriously perforated, the internal chamber of the joint is also perforated, since it perfectly lines the inside of the joint wall. The seal is thus destroyed which in most of the aforementioned applications is unacceptable because it can result in consequences which are harmful to the safety of persons and materials.

U.S. Pat. No. 3,359,687 describes an inflatable, expandable joint for aeronautical pressurization systems, including two sealed compartments with corrugated walls which can be inflated individually and which are separated by a partition. The expansion of the joint in service is obtained by the inflation of a single compartment at a high pressure, the other lessinflated compartment remaining retracted. In case the expanded compartment is punctured, the pressure of the other compartment causes it to expand, which allows the expansion of the joint to be maintained. In this operation, the partition separating the two expandable compartments plays a neutral separation role.

SUMMARY OF THE INVENTION

The present invention has as its object the resolution of the problem of maintaining the safety of an inflatable elastomer joint in a manner different from that which is described by U.S. Pat. No. 3,359,687. According to the invention, the septum which separates the joint into two chambers intervenes for the maintenance of the seal in case of a puncture.

More particularly, the pneumatic safety seal joint made of elastomer according to the invention includes an external seal wall, a base and two lateral walls, which define an internal volume of maximum internal width $l$ between the two lateral walls and of maximum internal height $H$ between the seal wall and the base and, in addition, an internal sealed septum which divides the internal volume into two chambers, each with a means of pressurization. According to the invention, the internal sealed septum is connected to the lateral walls so that the respective volumes of the two chambers which it separates are in a ratio between 0.9 and 1.1 and, in addition:

1. If $l/H$ is between 1 and 2, the joint having an internal cavity in circular or rectangular shaped right section, the developed width L of this sealed septum at rest is between 1.1 times and 1.4 times the internal width $l$.

2. If $l/H$ is between 2 and 8, the joint having an internal cavity in oval or rectangular shaped right section, much wider than it is high, the developed width L of this sealed septum at rest, i.e. in the uninflated state, is at least equal to the internal width $l$ while being less than or equal to 1.2 times this internal width, which is more simply is expressed as:

$$1 \leq L \leq 1.2 l.$$

In case either of these two chambers is punctured, the sealed internal septum in the invention deforms under the effect of the pressure of the other chamber and presses against the external seal wall or the base wall of the punctured chamber, such that the seal that the joint ensured is preserved.

Most often, the two chambers of the joint in the invention are inflated at equal pressures and have comparable wall thicknesses, such that the ratio of their respective volumes remains more or less constant when passing from the retracted or resting state to the inflated state. For the safety of the joint, in which the internal seal septum plays a similar role with respect to the two chambers, it is preferable for the two chambers to have volumes which are more or less equal with respective volumes in a ratio between 0.95 and 1.05.

According to the invention the developed width of the internal seal septum of the joint, after deformation under the effect of the differential pressure resulting from the puncturing of a chamber must be sufficient for this septum to come into contact and press against the wall of the punctured chamber. The situation of the developed width of the internal septum with respect to the dimensions of the internal volume and, in particular, with respect to the internal width, changes between the uninflated state and the inflated state when the joint is wider than it is high, because then the joint tends to fill out on inflation and thus the septum buckles if it was planar in the uninflated state, or buckles further if it was already corrugated. It is from this situation in the inflated state which the additional deformation due to the differential pressure in case of puncture must allow the maintenance of the seal, as has been described. At rest, the ratio of the developed width of the internal septum to the internal width must thus preferably be greater when the joint will tend to deform less so as to fill out on inflation, i.e., when its "l/H" ratio decreases, approaching 1.

The thickness of the internal septum in the invention must, in addition, preferably be sufficiently small to facilitate its extension and deformations, but not too thin, due to the risks of potential punctures. The thickness of the lateral walls, or their thinnest area when non-constant, is taken as a point of reference and it is preferable for the thickness of the internal septum at rest to be between 0.6 times and 1 time this lateral wall thickness, and, optimally, for it to be between 0.7 times and 0.9 times this thickness, so as to allow a proper preferential deformation of the internal seal septum in case of puncture.

With either of these thickness conditions, two cases, on which the following examples bear, are particularly interesting in practice:

1. When "l/H" is between 1 and 1.5, the internal seal septum preferably connects with the two lateral walls, more or less at the same height and has a developed width at rest between 1.2 times and 1.4 times the internal width l.

2. When "l/H is between 3 and 5, the internal seal septum has a developed width at rest L equal to the internal width l and it connects with each of the lateral walls at an 80–100 degree angle, and approximately at the same height as these lateral walls.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
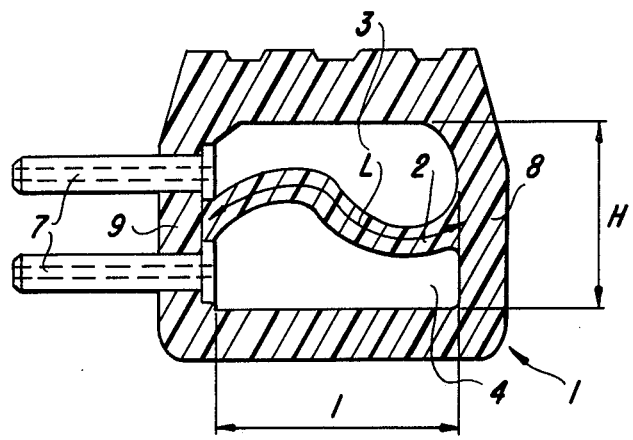
FIG. 1 is a right section of a first embodiment of the joint according to the invention, of more or less rectangular shape, in the uninflated state.

The joint 1 of the first embodiment in the uninflated state (FIG. 1) has a maximum internal diameter 1 of 28 mm and a maximum internal height H of 24 mm. It has an internal seal septum 2 with developed width L equal to 36 mm, or 1.28 times the internal width l. The septum 2 divides the internal volume of the joint into two chambers, an upper chamber 3 and a lower chamber 4, of more or less equal volumes. This corrugated septum 2, which is 3 mm thick, is connected at its two ends to the internal surfaces of the lateral walls 8 and 9 of the joint, which are 3.5 mm thick, at the same height of these internal surfaces. Each chamber 3 and 4 is equipped with at least one valve connection 7 which connects it to a pressurized fluid source, such that both chambers are under the the same pressure. These connections are placed laterally (as shown) or on the back of the joint in the case of a self-enclosed linear joint, such as a circular joint. In the use of elongated linear joints the connections 7 are placed at the end of the joint and attached to elastomer plates or stoppers which seal them at their ends.

When the joint 1 is inflated (FIG. 2) at a same pressure of 1.3 bars for both chambers, the internal height of the joint increases to approximately equal its internal width, whereas this internal width and the developed width of the internal septum 2 remain more or less constant. The corrugated internal septum 2 has an unstable position of equilibrium between the chambers 3 and 4; it can thus occupy any position within the joint 1 without notable constraint.

Figure 2:
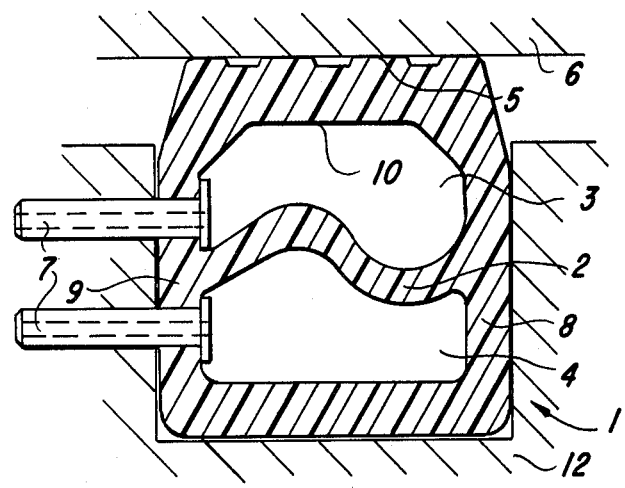
FIG. 2 is a right section of the joint of FIG. 1 in the inflated state.

In the specific case shown in FIG. 2, the joint is placed in a groove cut, for example, in the fixed wall of a sealed enclosure, the seal surface 5 coming to press against the planar support 6 which is, for example, the door or the movable element of the sealed enclosure. The opposite arrangement is also possible, i.e., the groove can be cut into the movable element.

Figure 3:
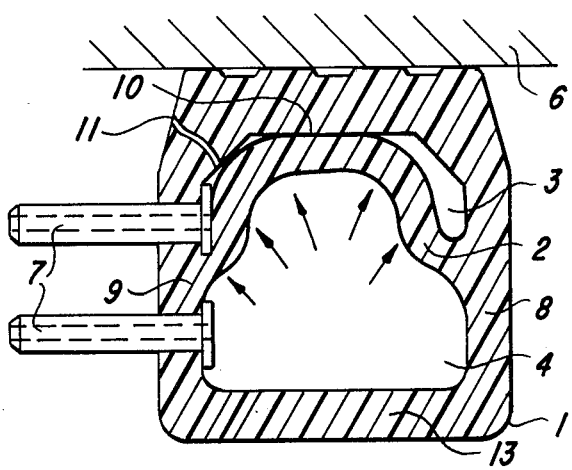
FIG. 3 is a right section of the joint of FIG. 1 after the puncturing of its seal arch.

When one of the parts of the joint, for example the seal arch 10 is torn or perforated at 11 (FIG. 3), the chamber 3 loses its pressure and the septum 2 is then subject to a pressure difference with respect to the other chamber 4 which is still intact. The septum 2 thus deforms under the effect of the pressure of the chamber 4 and comes into contact with the arch 10 of the chamber 3 which is then at atmospheric pressure or, at very least, at a pressure less than that of the chamber 4. The seal is thus preserved. One can, if need be upon detection of the perforation 11, increase the pressure in the intact chamber 4.

Figure 4:
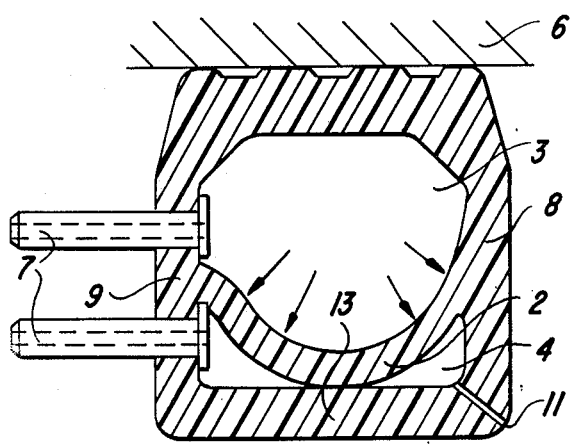
FIG. 4 is a right section of the joint of FIG. 1 after the base is punctured.

FIG. 4 shows the inverse situation in which the perforation 11 has affected the lower chamber 4. The septum 2 then comes to press against the internal wall of the base 13 of the chamber 4 which has dropped to atmospheric pressure. The seal on the support 6 is preserved in the same manner as discussed above. In this situation, as in the preceeding one, the proper application of pressure of the septum 2 is simultaneously provided by its buckling or additional developed width and the additional extension due to the pressure of the unpunctured chamber, and it is facilitated by the thickness of the septum 2 which is slightly less than that of the lateral walls 8 and 9.

The joint in the second embodiment 100 is of oval-type and has in the uninflated state (FIG. 5) a maximum internal width 1 of 107 mm and a maximum internal height H of 25 mm, resulting in an l/H ratio of 4.1, with a wall thickness of 10 mm. It has an internal seal septum 20, with a developed width at rest of 107 mm, a width equal to the internal width l, and 7.5 mm thickness. This internal septum 20 is connected to the internal surfaces of the lateral walls 80 and 90 in a perpendicular manner and approximately at the midpoint of these lateral walls. The height of these walls can then be termed "connection rounding included". The septum separates the internal volume of the two chambers 30 and 40 which have approximately the same volume.

Figure 7:
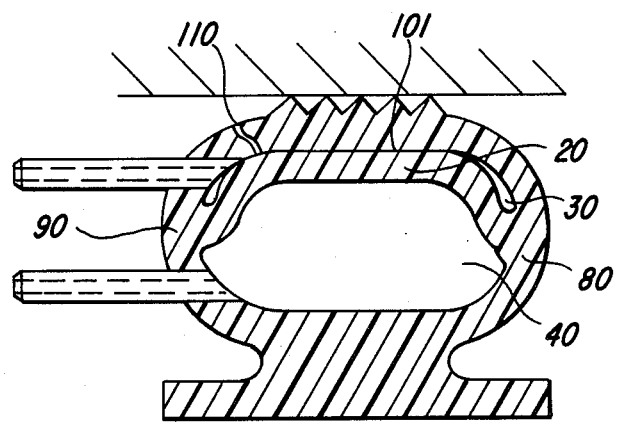
FIG. 7 is a right section of the second joint after its seal arch is punctured.
Figure 8:
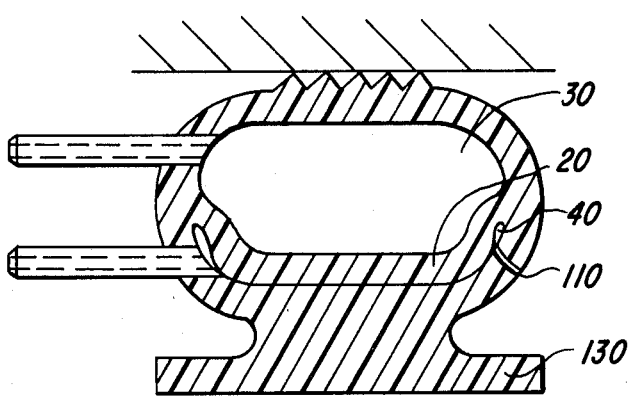
FIG. 8 is a right section of the second joint, after the lower part of its lateral wall is punctured.

The inflated joint 100 (FIG. 6) is deceased in width and increased in height, and its sealed septum 20 is now buckled. The prior corrugation of this septum, which prepares it for its sealing function in case of the puncturing of one of the two chambers 30 or 40, is thus obtained by the deformation of the joint (l/H about 4) upon its inflation. As in the first example, both chambers are inflated at the same pressure and the seal septum 20 occupies an unstable equilibrium position between these two chambers. FIGS. 7 and 8 respectively show the same puncture situations as FIGS. 3 and 4: when the upper chamber 30 is broken with a perforation 110 (FIG. 7), the internal septum 20 comes into contact with the arch 101 and supports this arch 101, whereas when the the lower chamber 40 is broken with a perforation, 110 the septum 20 comes to press against the internal wall of the base 130.

This second type of joint is designed to be mounted by its base in a "dovetail" type groove, for example. Other forms of joints according to the invention, designed for relatively low service pressures, do not need slots or grooves for their assembly.

EXAMPLE

Figure 5:
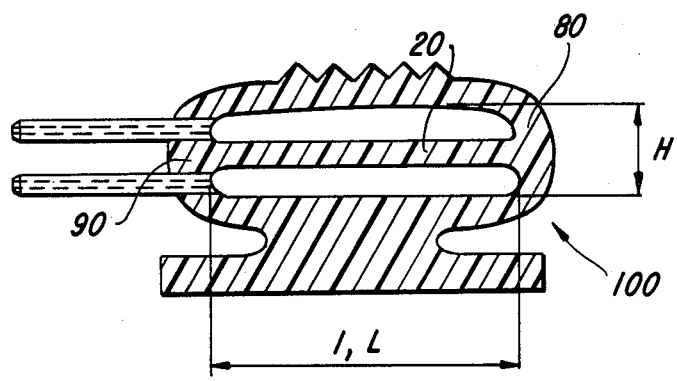
FIG. 5 is a right section of a second embodiment of the joint according to the invention, of more or less oval-shaped section, in the uninflated state.
Figure 6:
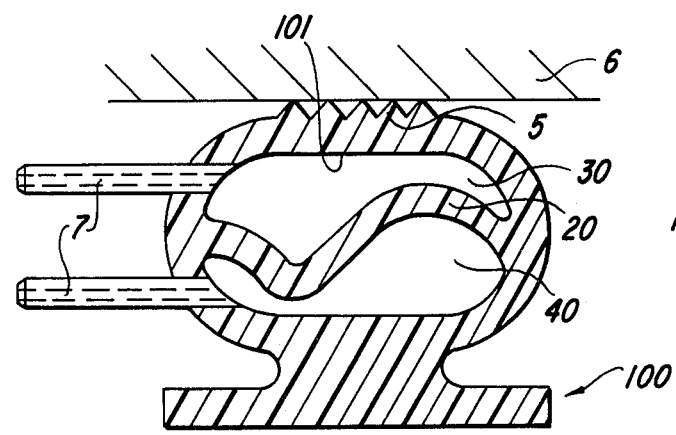
FIG. 6 is a right section of the second joint in the inflated state.

A series of extruded joints two meters long and made of "SBR" polymer (styrene-butadiene-rubber), conforming to the second embodiment and having at rest a section diagrammatically shown in FIG. 5, and in the inflated state a section diagrammatically shown in FIG. 6 were formed. At rest, in the retracted state, the joints had a width of 130 mm and a height of 75 mm. To test the behavior of the internal septum and its response to the loss of pressure in either of the chambers, the joints to be tested were connected by connectors 7 to a pneumatic system, controlled to achieve the successive cycles of:

1. The application of an equal pressure of 2 bars to the two chambers.
2. The deflation of one chamber which caused a drop in pressure from 2 to about 1 bar in the chamber which was still pressurized, the volume of which was roughly doubled.
3. The restoration to the pressure of 2 bars of the chamber which was still pressurized.
4. The re-inflation to 2 bars of the deflated chamber, and deflation of the chamber which was pressurized.
5. The repetition of the above steps.

It was noted that when both chambers were pressurized the height of the joint was 130 mm (instead of 75 mm in the "retracted" state). When one chamber was deflated and the other was at a pressure of 2 bars, the height is 120 mm, which is very largely sufficient to ensure, for example, the seal of cofferdam sliding surfaces in reactor pools, in which the normal clearance can, for example, be about 100 mm.

After 15000 alternating cycles, no alteration in the seal of the joint and the septum appeared, the height of the inflated joint, with a deflated chamber, remaining equal to 120 millimeters and the height, in the retracted state, equal to 75 mm.

In addition, this type of joint can resist an internal pressure which is at least equal to 3 times its service pressure in either chamber, or in both of them, due to the presence of the median septum which limits the stress on the lateral walls.

The implementation of the joint with internal septum, the purpose of the invention, notably improves the safety of the seal devices, notably in the nuclear, aerospace, electronic and medical areas.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A pneumatic safety seal joint made of elastomer, comprising:

an external seal wall;
   a base; and
   two lateral walls connecting side base and seal wall, thereby defining an internal volume with a maximum internal width l between said two lateral walls and maximum internal height H between said external seal wall and said base; and
   an internal seal septum which divides said internal volume into two chambers, each said chamber having a means of pressurization, wherein said internal seal septum is connected to said lateral walls such that the respective volumes of the two chambers are in a ratio between 0.9 and 1.1, and wherein:
   when l/H is between 1 and 2, a developed width L of said sealed septum at rest is between 1.1 times and 1.4 times said internal width l;
   when l/H is between 2 and 8, said developed width L is such that:

$$1 \leq L \leq 1.21.$$

2. A seal joint according to claim 1, wherein said internal seal septum has a thickness between 0.6 and 1 times the thickness of a thinnest portion of said lateral walls.

3. A seal joint according to claim 2, wherein said internal seal septum has a thickness between 0.7 times and 0.9 times the thickness of a thinnest portion of said lateral walls.

4. A seal joint according to claim 2, wherein l/H is between 1 and 1.5, wherein said sealed internal septum is connected to said lateral walls at substantially the same height, and wherein said developed width at rest L is between 1.2 times and 1.4 times said internal width l.

5. A seal joint according to claim 2, wherein l/H is between 3 and 5, wherein said developed width at rest L is equal to said internal width l, and wherein said septum is connected to each of said lateral walls at an 80 to 100 degree angle and at approximately the same height for each of said lateral walls.

6. A seal joint according to claim 1 including means to detect a perforation in one of said chambers and a means to increase the pressure in an unperforated chamber.

7. A seal joint according to claim 1 including means for providing substantially equal pressure in both of said chambers.